United States Patent
Chopra et al.

(10) Patent No.: US 6,445,490 B1
(45) Date of Patent: Sep. 3, 2002

(54) ENCAPSULATED GYRICON SPHERES

(75) Inventors: Naveen Chopra, Oakville; Peter M. Kazmaier, Mississauga; Karen A. Moffat, Brantford; Paul J. Gerroir, Oakville, all of (CA)

(73) Assignee: Xerox Corporation, Stamford, CT (US)

( * ) Notice: Subject to any disclaimer, the term of this patent is extended or adjusted under 35 U.S.C. 154(b) by 50 days.

(21) Appl. No.: 09/722,334

(22) Filed: Nov. 28, 2000

(51) Int. Cl.$^7$ .............................. G02B 26/00; B01J 13/02
(52) U.S. Cl. ..................... 359/296; 427/213.34
(58) Field of Search ....................... 359/296; 345/85, 345/107; 349/86; 427/213.3, 213.31, 213.34, 213.36; 428/323, 327, 402.21, 407; 264/4.7, 343; 523/207, 210

(56) References Cited

U.S. PATENT DOCUMENTS

| | | | |
|---|---|---|---|
| 4,261,653 A | 4/1981 | Goodrich | 359/296 |
| 5,037,716 A | 8/1991 | Moffat | 430/109 |
| 5,262,098 A | 11/1993 | Crowley et al. | 264/8 |
| 5,344,594 A | 9/1994 | Sheridon | 264/4.1 |
| 5,389,945 A | 2/1995 | Sheridon | 345/85 |
| 5,604,027 A * | 2/1997 | Sheridon | 264/4 |
| 5,717,514 A | 2/1998 | Sheridon | 359/296 |
| 5,815,306 A | 9/1998 | Sheridon et al. | 359/296 |
| 5,989,629 A | 11/1999 | Sacripante et al. | 427/180 |
| 6,097,531 A | 8/2000 | Sheridon | 359/296 |
| 6,235,395 B1 * | 5/2001 | Sacripante et al. | 345/107 |
| 6,241,921 B1 * | 6/2001 | Jacobson et al. | 264/1.36 |

OTHER PUBLICATIONS

U.S. patent application Ser. No. 09/722,565, filed Nov. 28, 2000, Now U.S. Patent 6,406,747 to issue Jun. 18, 2002.

* cited by examiner

Primary Examiner—Evelyn A Lester
(74) Attorney, Agent, or Firm—Oliff & Berridge, PLC; Eugene O. Palazzo

(57) ABSTRACT

A particulate encapsulated Gyricon element includes a Gyricon sphere encapsulated within a shell that also contains a dielectric fluid in which the Gyricon sphere is able to rotate. The shell is preferably formed around the Gyricon sphere and the dielectric fluid by interfacial condensation polymerization. Display elements such as electric paper can be readily derived by coating the encapsulated Gyricon elements upon a substrate. Display elements can thus be readily achieved without the need for an expensive elastomer binder sheet or the need to have the sheet in contact with a dielectric fluid.

8 Claims, 1 Drawing Sheet

ENCAPSULATED GYRICON SPHERES

BACKGROUND OF THE INVENTION

1. Field of the Invention

The present invention relates to encapsulated Gyricon spheres that are not required to be embedded in an oil-filled elastomer binder sheet, to novel displays employing such encapsulated spheres, and to methods of making such encapsulated spheres and displays.

2. Discussion of Related Art

Gyricon displays, also called twisting-ball displays, rotary ball displays, particle displays, dipolar particle light valves, reimageable displays, etc., offer a technology for making a form of electric paper. Briefly, a Gyricon display is an addressable display made up of a multiplicity of optically anisotropic balls, each located within a fluid-filled cavity of a transparent sheet such as an elastomer, and each of which can be selectively rotated to present a desired face to an observer. For example, a Gyricon display can incorporate balls each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accommodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the Gyricon balls or spheres rotate in response thereto, thereby presenting either a black or white side surface to the viewer.

Preparation of these known types of Gyricon displays involve several steps. First, the Gyricon spheres must be cast in the transparent sheet material, for example a silicon elastomer sheet. The sheet is then cured and immersed in a dielectric fluid such as oil. The sheet absorbs the oil, and oil-filled pockets form around each Gyricon sphere.

An exemplary Gyricon display 10 of this type is shown in side view in FIG. 1. Bichromal balls 11 are disposed in an elastomer binder of the sheet 12 that is swelled by a dielectric fluid creating cavities 13 in which the balls 11 are free to rotate. The balls 11 are electrically dipolar in the presence of the fluid and so are subject to rotation upon application of an electric field, as by matrix-addressable electrodes 14a, 14b. The electrode 14a closest to viewing surface 15 is preferably transparent. An observer at I sees an image formed by the black and white pattern of the balls 11 as rotated to expose their black or white faces (hemispheres) to the viewing surface 15 of sheet 12.

U.S. Pat. No. 5,389,945, incorporated by reference herein, shows that Gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Typically, known Gyricon displays are made up of bichromal balls that are black on one hemisphere and white on the other. Other kinds of rotating elements are also known. For example, U.S. Pat. No. 4,261,653 shows a multilayer sphere, although it is made at least in part from glass and its use depends on an addressing scheme involving high-frequency electric fields.

Other commonly owned patents related to Gyricon displays, each incorporated herein by reference in their entireties, include U.S. Pat. Nos. 5,262,098, 5,344,594, 5,717,514, 5,815, 5,989,629 and 6,097,531.

There are several drawbacks to existing Gyricon display technology. The Gyricon elastomer sheet must be kept wet with oil in order for the balls to maintain their rotation capabilities, as evaporation of the oil from the sheet (such as would occur upon exposure to the atmosphere) causes collapse of the cells and immobilization of the Gyricon spheres therein. Also, the need to have the spheres embedded within sheets, as well as the need to limit exposure to the atmosphere, severely limits the ease of use of the display.

What is still needed is an improved Gyricon display and method of making the same that permits more practical displays to be made.

SUMMARY OF THE INVENTION

It is therefore an object of the present invention to develop a method of making novel Gyricon spheres that are not required to be embedded in a sheet, and thus does not require constant exposure to the dielectric fluid to maintain the cavities within the sheet.

It is a further object of the present invention to develop a method of making the novel Gyricon sphere that is efficient and cost effective.

It is a still further object of the present invention to develop novel Gyricon displays that have greater ease of manufacture and use, thereby increasing the utility of the technology.

These and other objects of the present invention are achieved herein by obtaining self-contained particulate encapsulated Gyricon elements, each comprised of a Gyricon sphere encapsulated within a shell that also contains a dielectric fluid in which the Gyricon sphere is able to rotate.

These and other objects are also achieved by a method of making an encapsulated Gyricon element comprised of an encapsulating shell containing a Gyricon sphere and a dielectric liquid, comprising encapsulating the Gyricon sphere and the dielectric liquid with the encapsulating shell by forming the shell by interfacial condensation polymerization in the presence of the Gyricon sphere and the dielectric liquid.

These and other objects are also achieved by a display element, comprising one or more particulate encapsulated Gyricon elements upon a substrate, wherein the particulate encapsulated Gyricon elements comprise a Gyricon sphere encapsulated within a shell that also contains a dielectric fluid in which the Gyricon sphere is able to rotate.

These and other objects are further achieved by simple, convenient method of making the display elements, comprising applying to a substrate one or more encapsulated Gyricon elements comprised of a Gyricon sphere encapsulated within a shell that also contains a dielectric fluid in which the Gyricon sphere is able to rotate.

By self-containing the Gyricon spheres within dielectric fluid filled encapsulated shells, display elements can be easily made without the need for an expensive elastomer binder sheet or the need to have the sheet in contact with a dielectric fluid.

DETAILED DESCRIPTION OF PREFERRED EMBODIMENTS

Figure 1:
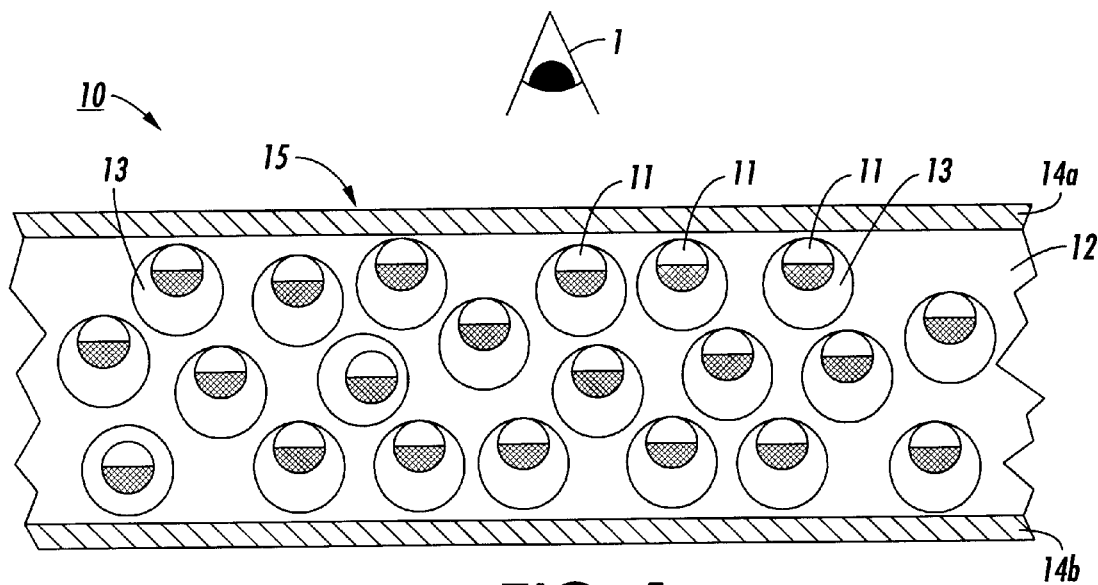
FIG. 1 is a cutaway side view of a known black-and-white Gyricon display.
Figure 2:
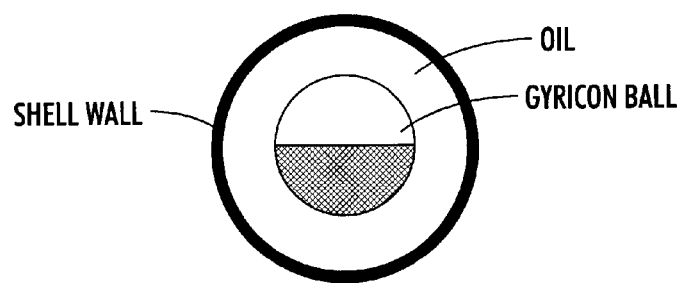
FIG. 2 is a cutaway side view of an encapsulated Gyricon element of the present invention.

Each of the encapsulated Gyricon elements of the present invention comprise a Gyricon sphere and dielectric fluid encapsulated within a shell. FIG. 2 is a cutaway side view of an example encapsulated Gyricon element of the present invention. Each of these materials will first be explained, followed by an explanation of how to make the encapsulated spheres.

The Gyricon spheres, or rotating elements, of the present invention may be any type known in the art without limitation. As is well understood in the art, the only requirement of the rotating elements is that they must be electrically anisotropic in the presence of a dielectric fluid so as to be subject to rotation upon application of an electric field, for example as by matrix-addressable electrodes. Typically, Gyricon spheres comprise bichromal balls that are black in one hemisphere and white in the other. The coatings preferably create optical anisotropy in the rotating elements.

Other kinds of rotating elements are also known. For example, U.S. Pat. No. 4,261,653, incorporated herein by reference, shows a multilayer ball, although it is made at least in part from glass and its use depends on an addressing scheme involving high-frequency electric fields. U.S. Pat. No. 5,815,306, incorporated herein by reference, shows an array of rotatable lens imaging elements, such as spherical lenses having aperture masks or aperture stops. U.S. Pat. No. 5,717,514, incorporated herein by reference, shows polychromal segmented balls.

In one embodiment, the rotating elements have hemispherical coatings of different zeta potential. For example, the difference in zeta potential can be achieved by applying a coating to one hemisphere of each of the spheres that exhibits optical absorption characteristics, and by applying a coating to the other hemisphere of each of the spheres that exhibits light reflectance characteristics. The difference between the light reflectance-light absorption characteristics of the hemispheres provides a desired optical anisotropy. Specifically, the spheres may be comprised of black polyethylene with a light reflective material, for example, titanium oxide, sputtered on one hemisphere to provide the spheres with the desired light reflective and light absorptive hemispheres.

Due to the difference in zeta potential between the segments of the rotating elements and the immersion of each of the elements in the dielectric fluid, the rotating elements acquire an electrical charge where, for example, one hemisphere is more positive than the other hemisphere of the rotating element. When a power source is applied, the rotating elements can be made to rotate in the electric field developed by the energized electrodes, such that the desired hemisphere can be oriented toward a viewer.

The rotating elements can have a size of from, for example, about 1 to about 200 microns, more preferably from about 80 to about 110 microns, in volume average diameter as measured by the Coulter Counter, with hemispheres of contrasting, or different, colors and dissimilar zeta potentials and more specifically opposite surface charges. Once encapsulated, the encapsulated Gyricon element has a size (average diameter) of from, for example, about 5 to about 250 microns.

Any fluid, or mixture of fluids, having dielectric properties may be used as the dielectric fluid to be encapsulated within the shell along with the Gyricon spheres. Preferred dielectric fluids include, for example, any plasticizer fluid, partially fluorinated fluids such as, for example, 3M HFE 7100, a partially fluorinated hydrocarbon made by 3M, Isopar L or Isopar M, which are aliphatic hydrocarbons made by Ashland Chemicals, partially fluorinated hydrocarbons made by Halocarbon Products Inc. or Freon TF, a partially fluorinated polyethylene, oils such as, for example, silicon oils, vegetable oils such as, for example, soybean oil and coconut oil, trigliceride fluids such as, for example, tributyrin and tricaproin, fully fluorinated liquids such as, for example, perfluorooctane, aromatic organic solvents such as, for example, benzene, toluene, or xylene, deionized water, mixtures thereof, etc. Mention may also be made of the materials listed in U.S. Pat. No. 6,067,185 beginning at column 16, line 17, incorporated herein by reference.

As the shell of the encapsulated Gyricon elements, a polymeric shell is most preferred. While any suitable polymer material may be used without limitation for the shell, the shell most preferably is a polymer derived from two monomers that can be dissolved, respectively, in two mutually immiscible solvents (such as, for example, organic solvents and water). This enables the polymer to be formed at the interface of the two solvents via interfacial condensation polymerization, as more fully explained below.

Shell polymers suitable for use with the present invention include those which may be formed in an interfacial condensation polymerization process. Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Epoxy monomers or oligomers such as Epikote 819 can also be added in amounts of from about 0.01 percent to about 30 percent to copolymerize into the shell as strengthening agents. Various polyfunctional shell monomers, such as triamines, triisocyanates, and triols can be employed in small quantities of from about 0.01 percent to about 30 percent as crosslinking agents to introduce rigidity and strength into the shells. Shell polymers can also be formed by the reaction of aliphatic diisocyanates, such as meta-tetramethylene diisocyanate and a polyamine, reference for example the U.S. Pat. No. 5,037,716, incorporated herein by reference in its entirety.

Most preferably, the polymer shell material is comprised of a polyamide (from, e.g., diacid chloride and diamine monomers), a polyester (from, e.g., diacid chloride and diol monomers), a polyurea (from, e.g., diisocyanate and diamine monomers), a polyurethane (from, e.g., diisocyanate and diol monomers) or mixtures thereof. The diacid chloride monomers and diisocyanate monomers may be dissolved in an organic phase, while the diamine and diol monomers may be dissolved in an aqueous phase.

Suitable shell monomers are usually selected from monomers wherein the number of chemical reacting groups per molecule is two or more. The number of reacting groups per molecule is referred to as the chemical functionality. An organic soluble shell monomer, which has a functionality of 2 or more, reacts with an aqueous soluble shell monomer, which has a functionality of 2 or more, via interfacial condensation polymerization to generate the shell polymer in an embodiment of the present invention.

The organic soluble shell monomer can include (1) diisocyanates such as, for example, toluene diisocyanate, hexamethylene diisocyanate, trans-1,4-cyclohexane diisocyanate, meta-tetrametbylxylene diisocyanate (m-TMXDI), trimethylhexamethylene diisocyanate (TMDI), hexane diisocyanate (HDI), 4,4'-dicyclohexylmethane diisocyanate (Desmodur W), 4,4'-methyldiphenyl diisocyanate and even diisocyanate prepolymers such as polyether based liquid urethane prepolymer such as the Adiprene series available from DuPont; XPS and XPH series which are toluene diisocyanate terminated polyethylene oxide prepolymers available from Air Product, or (2) diacid chlorides (or, more generally, diacid halides), such as, for example, sebacoyl chloride, terephthaloyl chloride, phthaloyl chloride, isophthaloyl chloride, azeloyl chloride, glutaryl chloride and/or adipoly chloride. Examples of organic soluble shell monomers which have a functionality greater than 2 include 1,3,5-benzenetricarboxylic acid chloride; Isonate 143L (liquid MDI based on 4,4'-methyldiphenyl diisocyanate) purchased from The Upjohn Company; and tris(isocyanatophenyl) thiophosphate (Desmodur RF) purchased from Mobay Chemical Corporation.

Examples of monomers soluble in aqueous media and with a functionality of 2 include (1) diamines such as, for example, 1,6-hexanediamine, hexamethylenediamine, 1,4-bis(3-aminopropyl)piperazine, 2-methylpiperazine, m-xylene-α,α'-diamine, 3,3'-diamino-N-methyldipropylamine, 1,3-cyclohexanebis(methylamine), 1,4-diaminocyclohexane, 2-methylpentamethylene diamine, 2-methylpentanediamine (Dytek A) purchased from DuPont, 1,2-diaminocyclohexane, 1,3-diaminopropane, 1,4-diaminobutane, 2,5-dimethylpiperazine, piperazine, fluorine-containing 1,2-diaminobenzenes purchased from PCR Incorporated, and N,N'-dimethylethylenediamine; (2) diols such as bisphenol A, other bisphenols such as 4,4'-biphenol, 4,4-dihydroxydiphenyl ether, 3,3'- and 4,4'-(ethylendioxy)diphenol, 3,3'- and 4,4'-(butylenedioxy) diphenol, 4,4'-(hexafluoroisopropyldene)diphenol, 3,3'- and 4,4'-dihydroxydiphenyl ether, 3,3'- and 4,4'-biphenol, 4,4'thiobisphenols, 4,4'-[1,3-phenylenebis(1-methylethylidene)]bisphenol, 4,4'-bis(4-hydroxyphenyl) valeric acid and its alkylates, phenolphthalein and 3,3'- and 4,4'-methylenediphenols. Other diols which may be used include aliphatic diols such as: neopentyl glycol, ethylene glycol, propylene glycol, butylene glycol, diethylene glycol, dipropylene glycol, or mixtures thereof, or any other water soluble copolycondensation coreactant monomers/ prepolymers. Other aqueous soluble shell monomers having a functionality greater than 2 include diethylene triamine, bis(3-aminopropyl)amine, tris(2-aminoethyl)amine (TREN-HP) purchased from W.R. Grace Company, and the like.

More than one organic phase monomer can be used to react with more than one aqueous phase monomer. Although formation of the shell entails reaction in an embodiment between at least two shell monomers, one soluble in organic phase and one soluble in aqueous phase, as many as 5 or more monomers soluble in the organic phase and as many as 5 monomers soluble in aqueous phase can be reacted to form the shell. In some preferred instances, 2 monomers soluble in the organic phase and 2 monomers soluble in aqueous phase can be reacted to form the shell.

Further, optional reaction aids such as catalysts or curing agents, may be added to either of the solutions, if desired. For example, a shell crosslinking agent such as Desmodur RF (Bayer) may be added to the organic phase, if desired, in effective amounts of, for example, from about 0 to about 3 percent by weight of the monomers.

While several methods may be used to derive the encapsulating shell surrounding the dielectric fluid and the Gyricon sphere, the process of interfacial condensation polymerization is most preferably used in the present invention. As mentioned above, interfacial condensation polymerization occurs at the interface between two mutually immiscible solvents, usually an organic based solvent and an aqueous solvent (i.e., a water-based solution).

In one embodiment of the present invention, the process involves forming the organic solution/dispersion by dispersing the Gyricon spheres in a solution containing an organic solvent, a monomer dissolved therein, for example a diacid chloride or a diisocyanate monomer, and optionally also containing a dielectric fluid. Preferably, the solvent is itself a dielectric fluid such as an aliphatic hydrocarbon made by (Isopar L or Isopar M). However, the process can equally proceed using any organic solvent whether dielectric or not, such as any hydrocarbon liquid, so long as if the solvent is not a dielectric fluid, a dielectric fluid is also present in the solution.

The amount of the solvent compared to the amount of the Gyricon spheres in the organic phase dispersion should be such that the Gyricon spheres can each be coated with the dielectric fluid, e.g., by surface energy attraction of the fluid around the surface of the spheres. As an example, form about 10 to about 95 percent by weight Gyricon spheres can be added to the organic phase dispersion. The monomer level in the organic phase may be from, for example, about 1 to about 100% (100% meaning neat monomer is the solvent).

The organic phase dispersion is next brought into contact with an aqueous phase solution containing a monomer that coreacts with the monomer dissolved in the organic phase, for example a diamine or diol monomer. This solution is made by dissolving the monomer in water, preferably deionized water. The upper end of the monomer level in the aqueous phase is determined where the organic phase just barely becomes miscible with the aqueous phase. The monomer level thus may be, for example, from about 1 to about 50% monomer in aqueous solution.

Within the polymeric shell, the molar ratio of the organic soluble monomer to the aqueous soluble monomer is from about 1:1 to about 1:4, and preferably from about 1:1 to about 1:1.5.

In general, the interfacial condensation polymerization is conducted by first coating the Gyricon sphere with a first organic phase composition containing a first monomer dissolved in the organic solvent, and optionally a dielectric liquid, and subsequently exposing the coated Gyricon sphere to a second aqueous phase composition containing a second monomer dissolved in the aqueous solvent, whereby the first monomer and the second monomer are made to react to form the encapsulating shell.

In one embodiment, this is accomplished by first mixing the Gyricon spheres into the organic phase composition, followed by exposing the coated spheres to the aqueous phase composition. In this embodiment, the organic phase is brought into contact with the aqueous phase, for example by dropwise addition of the organic phase dispersion into the stirred aqueous phase solution. Upon contact, the monomers react (via a condensation reaction), forming a polymer skin around the droplets. As a result, the polymer shell is formed around the core of Gyricon sphere and the dielectric fluid. The reaction most preferably occurs under agitation, for example stirring. The polymeric shell typically forms very quickly upon contact of the two phases. However, the stirring and contact can continue for a period of, for example, about 1 minute to about 2 hours or more, if desired.

In another embodiment, the coating with the organic phase and exposure to the aqueous phase compositions can be done through the use of an ink-jet device, for example as detailed in U.S. application Ser. No. 09/722,565 (filed on even date herewith), now U.S. Pat. No. 6,406,747, incorporated herein by reference in its entirety. Briefly, the method comprises first jetting a precise amount of the organic phase composition onto the Gyricon sphere, which may be done by, for example, dropping the Gyricon sphere past the ink jet nozzle. The coating will wet the entire surface of the Gyricon sphere due to surface energies. The Gyricon sphere coated with the organic phase composition is then moved past an ink jet nozzle where it is jetted/sprayed with the aqueous phase composition, thereby causing reaction and the encapsulation.

In a still further embodiment, the coating with the organic phase and exposure to the aqueous phase compositions is conducted by dropping the Gyricon sphere through a fog of the organic phase composition and then subsequently dropping the coated Gyricon sphere through a fog of the aqueous phase composition. This method is also detailed in U.S. application Ser. No. 09/722,565 (filed on even date herewith), now U.S. Pat. No. 6,406,747, incorporated herein by reference in its entirety. Briefly in this embodiment, separate fogs are created of both the organic phase and aqueous phase compositions, and the Gyricon sphere is made to successively pass first through the fog of the organic phase and then through the fog of the aqueous phase. The Gyricon sphere may be dropped through both fogs successively if the fogs are made to have the organic phase fog above the aqueous phase fog. Like the ink jet embodiment above, the fog embodiment enables more precise control over the amounts of the compositions coated upon the sphere, thereby enabling more precisely sized encapsulated spheres to be derived and less waste of materials.

Preferably, the condensation reaction is conducted at room temperature for ecomomies. However, elevated temperatures may be used, if desired, to aid in the reaction. Following the encapsulation, the encapsulated Gyricon elements are collected by any suitable method known in the art. Following collection, the encapsulated Gyricon elements may be washed, if desired.

The encapsulated Gyricon elements can be used to form display elements that comprise one or more of the foregoing particulate encapsulated Gyricon elements upon a substrate. In a most preferred embodiment, the substrate is a flexible material/sheet such as, for example, paper, a polymer or an elastomer. The Gyricon elements may be sandwiched between two substrates, if desired.

The encapsulated Gyricon elements may be coated upon the surface of the substrate by any suitable means, for example by spraying or painting, and may be attached thereto by any suitable means, for example through the use of an adhesive on the surface of the substrate or a flexible polymer binder applied with the Gyricon elements.

The display elements so achieved can then be made to operate as conventionally known in the art of Gyricon displays, for example by bringing the display into association with an electric field that can cause the Gyricon spheres within the Gyricon elements to appropriately rotate so as to display a desired image.

EXAMPLE

In this example, an encapsulated Gyricon element is achieved. To a 50 mL test tube is added 20 mL of 1% polyvinylalcohol (88% hydrolyzed, 10,000 MW) followed by 7 drops of 2,2-dimethyl-1,3-propanediamine (ca. 800 mmol) with rapid stirring, thereby forming the aqueous phase.

In a 10 mL test tube is mixed 10 drops of m-TMXDI (ca. 737 mmol), 3 drops of 30% (weight) suspension of Gyricon spheres in Isopar M, and 2 drops of $CH_2Cl_2$. This organic phase is mixed and added dropwise to the aqueous phase under rapid stirring. Mixing is continued for 2 minutes.

The capsules that form sink to the bottom and are recovered with a Pasteur pipette. Analysis found that about 30% of the Gyricon spheres are encapsulated within shells.

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A method of making an encapsulated Gyricon element comprised of an encapsulating shell containing a Gyricon sphere and a dielectric liquid, comprising encapsulating the Gyricon sphere and the dielectric liquid with the encapsulating shell by forming the shell by interfacial condensation polymerization in the presence of the Gyricon sphere and the dielectric liquid, wherein the interfacial condensation polymerization comprises coating the Gyricon sphere with a first composition containing a first monomer dissolved in an organic solvent, and optionally a dielectric liquid, and subsequently exposing the coated Gyricon sphere to a second composition containing a second monomer dissolved in an aqueous solvent, whereby the first monomer and the second monomer react to form the encapsulating shell. a dielectric liquid.

2. The method according to claim 1, wherein the coating and the exposing steps are conducted via an ink jet device.

3. The method according to claim 1, wherein the coating step is conducted by dropping the Gyricon sphere through a fog of the first composition and the exposing step is conducted by subsequently dropping the coated Gyricon sphere through a fog of the second composition.

4. The method according to claim 1, wherein the coating step comprises adding the Gyricon sphere to the first composition and the exposing step comprises adding the first composition to the second composition.

5. The method according to claim 1, wherein the organic solvent is a dielectric liquid.

6. The method according to claim 1, wherein the first monomer is a diacid chloride monomer and the second monomer is a diamine or a diol monomer.

7. The method according to claim 1, wherein the first monomer is a diisocyanate monomer and the second monomer is a diamine or a diol monomer.

8. The method according to claim 1, wherein the organic solvent is not a dielectric liquid, and the first composition additionally includes the dielectric liquid.

* * * * *